(12) United States Patent
Papageorge

(10) Patent No.: US 8,152,538 B1
(45) Date of Patent: Apr. 10, 2012

(54) FLUID BONDING FITTING AND ASSEMBLY AND SYSTEM INCORPORATING THE FITTING, AND METHOD OF USE

(76) Inventor: Timothy A. Papageorge, Haydenville, MA (US)

(*) Notice: Subject to any disclaimer, the term of this patent is extended or adjusted under 35 U.S.C. 154(b) by 848 days.

(21) Appl. No.: 12/182,516

(22) Filed: Jul. 30, 2008

(51) Int. Cl.
H02H 3/00 (2006.01)
C02F 1/461 (2006.01)

(52) U.S. Cl. ... 439/100; 210/776; 210/348; 210/748.01; 361/42; 205/751; 204/665

(58) Field of Classification Search ............... 439/100, 439/91; 210/776, 348, 748.01; 204/665; 205/751; 361/42; 29/596
See application file for complete search history.

(56) References Cited

U.S. PATENT DOCUMENTS

| | | | |
|---|---|---|---|
| 3,420,558 A | 1/1969 | Whitten, Jr. | |
| 3,783,178 A * | 1/1974 | Philibert et al. | 174/86 |
| 3,967,872 A | 7/1976 | Mooney et al. | |
| 4,106,832 A * | 8/1978 | Burns | 439/100 |
| 4,763,365 A | 8/1988 | Gerondale et al. | |
| 4,781,827 A * | 11/1988 | Shields | 210/167.1 |
| 4,962,285 A | 10/1990 | Baker | |
| 5,115,862 A | 5/1992 | Hastings | |
| 5,222,770 A | 6/1993 | Helevirta | |
| 5,432,688 A | 7/1995 | Tobias et al. | |
| 6,021,033 A | 2/2000 | Benham et al. | |
| 6,407,469 B1 | 6/2002 | Cline et al. | |
| 6,643,108 B2 * | 11/2003 | Cline et al. | 361/42 |
| 6,684,588 B1 | 2/2004 | Jones | |
| 6,710,251 B2 | 3/2004 | Auclair | |
| 6,725,524 B2 * | 4/2004 | Lin et al. | 29/596 |
| 6,776,185 B2 | 8/2004 | Farrar et al. | |
| 7,168,416 B2 | 1/2007 | Powell et al. | |
| 2005/0063843 A1 | 3/2005 | Walker et al. | |

FOREIGN PATENT DOCUMENTS

| | | |
|---|---|---|
| JP | 61009137 | 1/1986 |
| JP | 2006200545 | 3/2006 |

* cited by examiner

Primary Examiner — Nam Nguyen
Assistant Examiner — Cameron J Allen
(74) Attorney, Agent, or Firm — Doherty, Wallace, Pillsbury & Murphy, P.C.

(57) ABSTRACT

An assembly for bonding a fluid, wherein the assembly comprises a fitting having an electrically conductive body comprising: a base, a first extension member which extends from a first part of the base, and a second extension member which extends from a second part of the base; and an electrically conductive protrusion extending from an exterior surface of the body; a fluid filter having a receiver which is in operable communication with the first extension member of the fitting; and a pump which draws the fluid from a fluid source and into the fluid filter, wherein the fluid further flows from the fluid filter and through the fitting; whereby the fluid, when it flows through the fitting, and when a bond wire is in electrical communication with the electrically conductive protrusion of the fitting, is bonded.

16 Claims, 4 Drawing Sheets

FLUID BONDING FITTING AND ASSEMBLY AND SYSTEM INCORPORATING THE FITTING, AND METHOD OF USE

BACKGROUND OF THE INVENTION

1. Field of the Invention

The invention relates to the bonding of a fluid. More particularly, the invention relates to a fluid bonding fitting, and an assembly and a system incorporating such fitting, wherein the fitting is used to facilitate the grounding of a fluid.

2. Background of the Invention.

Bonding is traditionally defined as "the joining of metallic parts to form an electrically conductive path that ensures electrical continuity and the capacity to conduct safely any current likely to be imposed." Therefore, electrical bonding in the traditional sense involves the practice of electrically connecting electrical and metallic objects to each other via conductors, thereby brining the objects to the same electrical potential. The primary reason for bonding is to reduce the risk of electrocution, such that an individual touching two electrically conductive objects at the same time does not receive a shock by becoming the path of equalization if the two objects happen to be at different electrical potentials. Bonding serves the additional purpose of protecting surrounding equipment by reducing the current flow on power and data conductors between pieces of equipment at different electrical potentials.

Bonding takes on an important significance when it comes to swimming pools, whirlpools, hot tubs, saunas, and the like. In these environments, any conductor over a certain size must be bonded to assure that all conductors are equipotential and do not provide a conductive path which could be potentially hazardous to a swimmer or bather. Particular to swimming pools, in an effort to further maximize the safety of swimming pool use, in 2008 a new electrical code regulation was implemented. This change in the code requires electrically connecting swimming pool water to one or more bonded parts such that the pool water is in direct contact with an approved corrosion resistant conductive surface that exposes not less than 9 square inches of surface area to the pool water at all times.

Currently, there is no known device and/or method capable of accomplishing the requirement set forth in the new code regulation in an efficient and cost effective manner. Accordingly, what is needed is a device capable of operating within a currently known swimming pool system, which can allow the system to efficiently and cost effectively comply with this new code regulation. However, the device should also be capable of working within and/or among other systems, i.e., within and/or among systems other than swimming pools systems, to broaden the device's diversity and appeal.

SUMMARY OF THE INVENTION

The deficiencies and drawbacks of the current practices used to bond swimming pools and like structures are overcome or eliminated by a novel fitting comprising an electrically conductive body comprising a base, a first extension member which extends from a first part of the base, and a second extension member which extends from a second part of the base; and an electrically conductive protrusion extending from an exterior surface of the body.

In an exemplary embodiment, the fitting may be integrated into an assembly useful for bonding a fluid, wherein the assembly comprises: the fitting; a fluid filter having a receiver which is in operable communication with the first extension member of the fitting; and a pump which draws the fluid from a fluid source into the fluid filter, wherein the fluid further flows from the fluid filter into the fitting; whereby the fluid, when it flows through the fitting, and when a bond wire is in electrical communication with the electrically conductive protrusion of the fitting, is bonded.

An exemplary system incorporating the exemplary assembly comprises a fluid source; a power source; a first feed which operably connects the fluid source to the filter; a second feed which is operably connected to the second extension member of the fitting; and a bond wire in electrical communication with the power source, the pump, the fitting, and the fluid source.

An exemplary method of bonding the fluid comprises circulating the fluid through the fluid source and the fluid bonding assembly, and engaging the bond wire with the electrically conductive protrusion of the fitting.

DETAILED DESCRIPTION OF THE INVENTION

Figure 1:
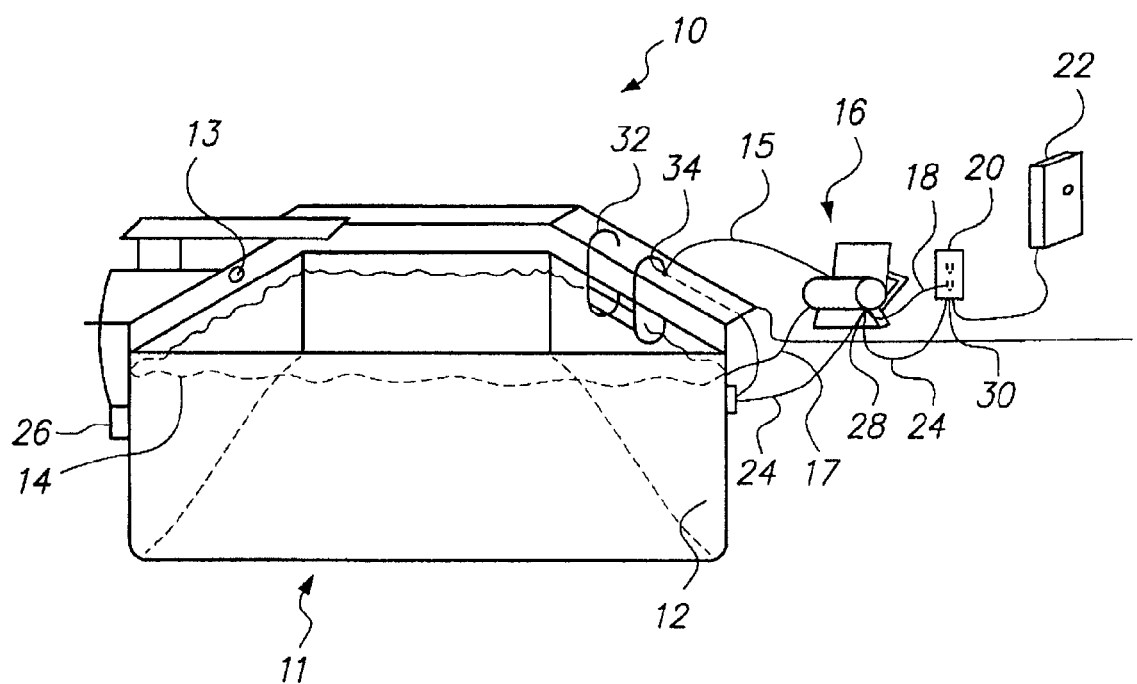
FIG. 1 is a schematic depicting a prior art swimming pool system.

Presently disclosed herein is an inventive fluid bonding fitting which can be easily integrated into a variety of systems in which the bonding of a fluid would be useful. Exemplary systems include, but are not limited to, for example, swimming pool systems, whirlpool systems, hot tub systems, sauna systems, and the like. It is further noted, that the "fluid" as used herein and throughout may refer to either or both of a liquid and a gas. Although, as will be detailed further below, the fitting of present invention is particularly useful in the bonding of water, particularly in the bonding of water circulating in a swimming pool system, and that, as such, a particularly exemplary application of the fitting is in its integration with a swimming pool system, the fitting is not to be limited to such an application, but rather, it's use and integration into and with a variety of systems as indicated above is fully contemplated and enabled by the present disclosure.

Nevertheless, as stated above, the fitting is particularly advantageous in its integration into a swimming pool assembly and system as the fitting allows for the bonding of the swimming pool water such that the requirements of the above-stated newly implemented code regulation is met, i.e., so "that the pool water is in direct contact with an approved corrosion resistant conductive surface that exposes not less than 9 square inches of surface area to the pool water at all times."

In general, the inventive fluid bonding fitting comprises a main body having a protrusion extending from a top surface thereof. A collar tapers inwardly from a proximal end of the main body and is coterminous with a first extension member. The fitting further comprises a second extension member, wherein such second extension member is coterminous with a distal end of the main body, and which may be tapered inwardly therefrom.

As stated above, in an exemplary application, the inventive fitting is integrated with a standard pool system, wherein such a system comprises a standard filter pump and a return hose. In this embodiment, the first extension member may engage the fitting to a water return hose, and the second extension member may engage the fitting to a filter pump. A bond wire, which electrically connects the various electrically conductive components of the system, is in electrical communication with the protrusion of the fitting, as well as, in electrical communication with a filter pump, the pool system's power supply source, and to a shell of the swimming pool. In this manner, the conductive surface of the fitting exposes not less than up to about 18 square inches of surface area to the pool water.

The invention will now be described more fully with reference to the drawings, wherein it is to be understood that the drawings are exemplary only, and, as such, that the invention is not to be limited to the embodiments described more fully below, but, rather that the invention is to include all obvious modifications and variations to the embodiments discussed below as would occur to one of ordinary skill in the art.

For purposes of understanding the integration and function of the inventive fluid bonding fitting into a standard swimming pool system, reference will be made to FIG. 1 which depicts a typical standard swimming pool system. Referring to FIG. 1, an exemplary swimming pool system 10 comprises a swimming pool 11 comprising a pool shell 12, which holds water 14. Swimming pool 11 further comprises a skimmer 13, which draws water 14 from the pool surface. System 10 also comprises a filter pump 16, wherein filter pump 16 is connected to skimmer 13 via a skimmer hose 15. A water return hose 17 is connected to filter pump 16 and extends to swimming pool 11 to return the filtered water 14 to pool 11.

Filter pump 16 comprises a plug 18 connected to an electrical outlet 20. Electrical outlet 20 in turn is in line with a service panelboard 22. A bond wire 24, which typically comprises an 8 American Wire Gauge ("AWG") bonding conductor, extends to and from pool shell 12, filter pump 16, and electrical outlet 20, and is connected to these various components via respective lugs 26, 28, and 30. Further depicted in FIG. 1 is an electrically conductive ladder 32, from and to which bond wire 24 also extends via a lug 34, which is attached to ladder 32. Through the connection of bond wire 24 to lugs 26, 28, and 30, and where ladder 32 is incorporated into system 10, to lug 34, the metal objects in association with system 10 are bonded to the grounded panelboard 22. The inventive fluid bonding fitting of the present invention serves to enhance the bonding of the system by bonding water 14 to the electrically conductive members of system 10.

Figure 2:
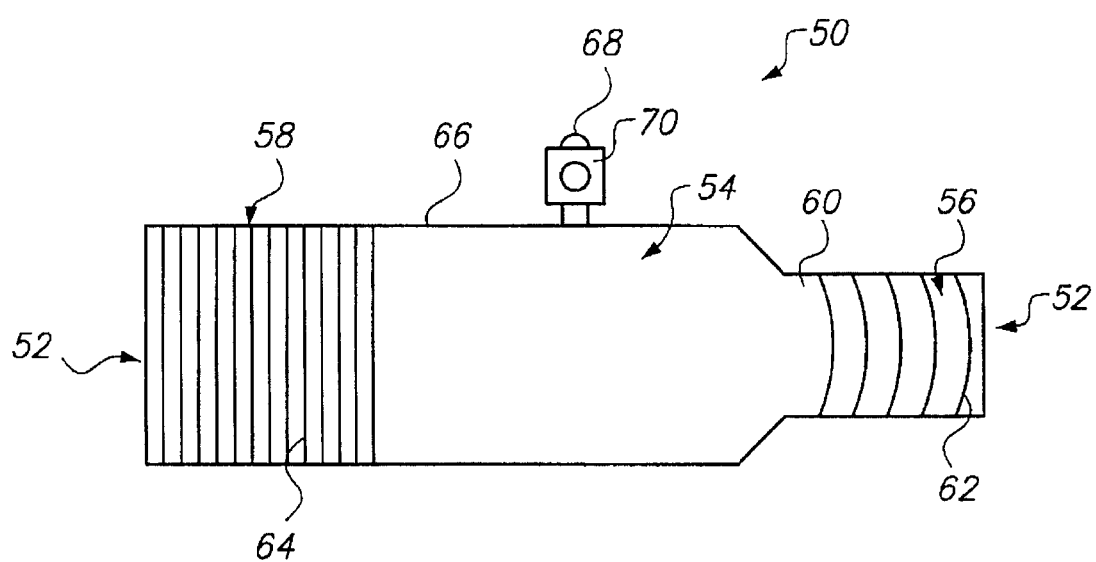
FIG. 2 is a schematic depicting an exemplary fluid bonding fitting of the present invention.

An exemplary fluid bonding fitting shall be described with reference to FIG. 2, wherein it is to be understood that the embodiment depicted in FIG. 2 is exemplary only, and that accordingly modifications and adaptations that would occur to one of ordinary skill in the art are contemplated herein. Referring to FIG. 2, an exemplary fitting 50 has a hollow interior 52, which is defined by a generally cylindrically-shaped base 54, an extension member 56, and an extension member 58. Base 54 comprises a collar 60 on a proximal end thereof, wherein collar 60 tapers inwardly from the proximal end. Coterminous with collar 60 is extension member 56. An exterior surface of extension member 56 is characterized by a plurality of barbs 62, wherein, as will be understood later herein, plurality of barbs 62 assists in the attachment of a water return hose 112 (see FIG. 4) to extension member 56. Extension member 58 is coterminous with a distal end of base 54, and comprises a threaded exterior surface 64, wherein threaded exterior surface 64 assists in securing fitting 50 to a filter pump 84 (see FIG. 3).

Fitting 50 further comprises a protrusion in the form of a stud butt 68, which is disposed on a top surface 66 of base 54, and preferably welded thereto. Attached to and disposed on stud butt 68 is a lug nut 70, wherein, as will be explained in further detail below, lug nut 70 serves to connect a bond wire to fitting 50.

Fitting 50 may be formed of a variety of materials provided that the material is suitably conductive to meet the functional requirements of the fitting. Nevertheless, an exemplary material comprises stainless steel.

Figure 3:
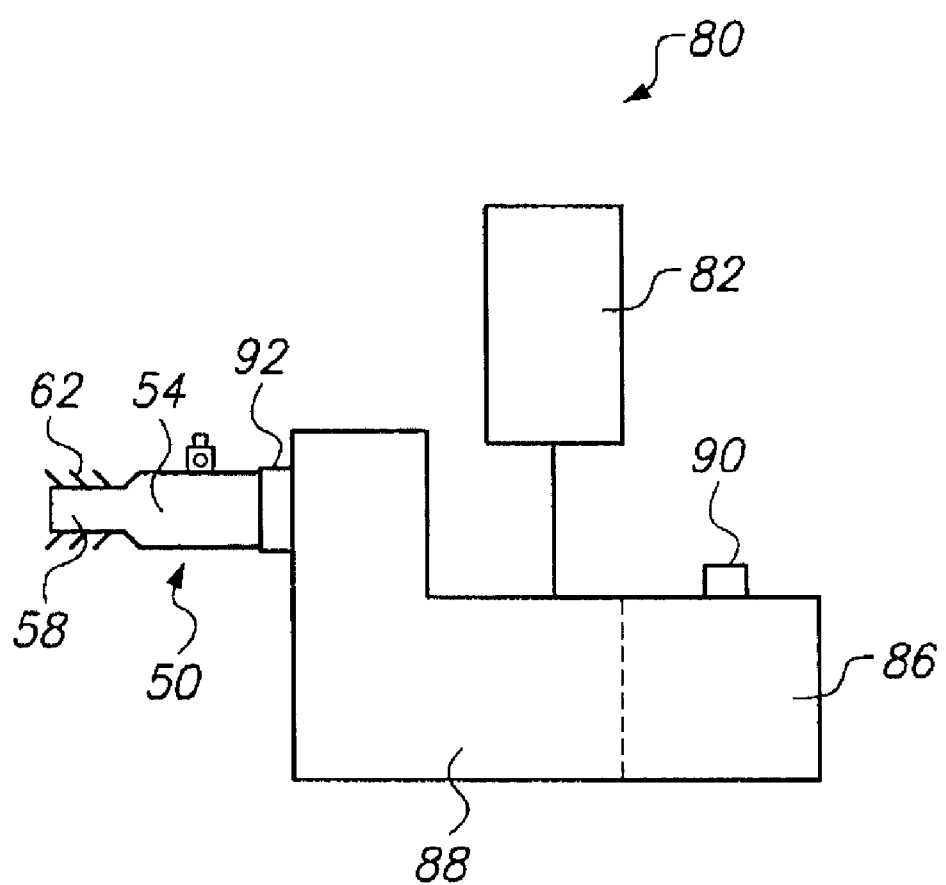
FIG. 3 is a schematic depicting an exemplary assembly incorporating the fitting depicted in FIG. 2.

An exemplary assembly integrating the inventive fitting is depicted in FIG. 3. Referring to FIG. 3, assembly 80 comprises a water reservoir 82 in connection with a filter pump 84, which comprises a pump 86 having a lug nut 90 on an exterior surface thereof. Filter pump 84 further comprises a filter 88 in communication with pump 86, wherein filter 88 comprises a receiving element 92 extending from a surface thereof. Assembly 80 also includes fitting 50 as described above, wherein threaded exterior surface 64 of extension member 58 is engaged with receiving element 92 of filter 88 to secure fitting 50 to filter pump 84.

Figure 4:
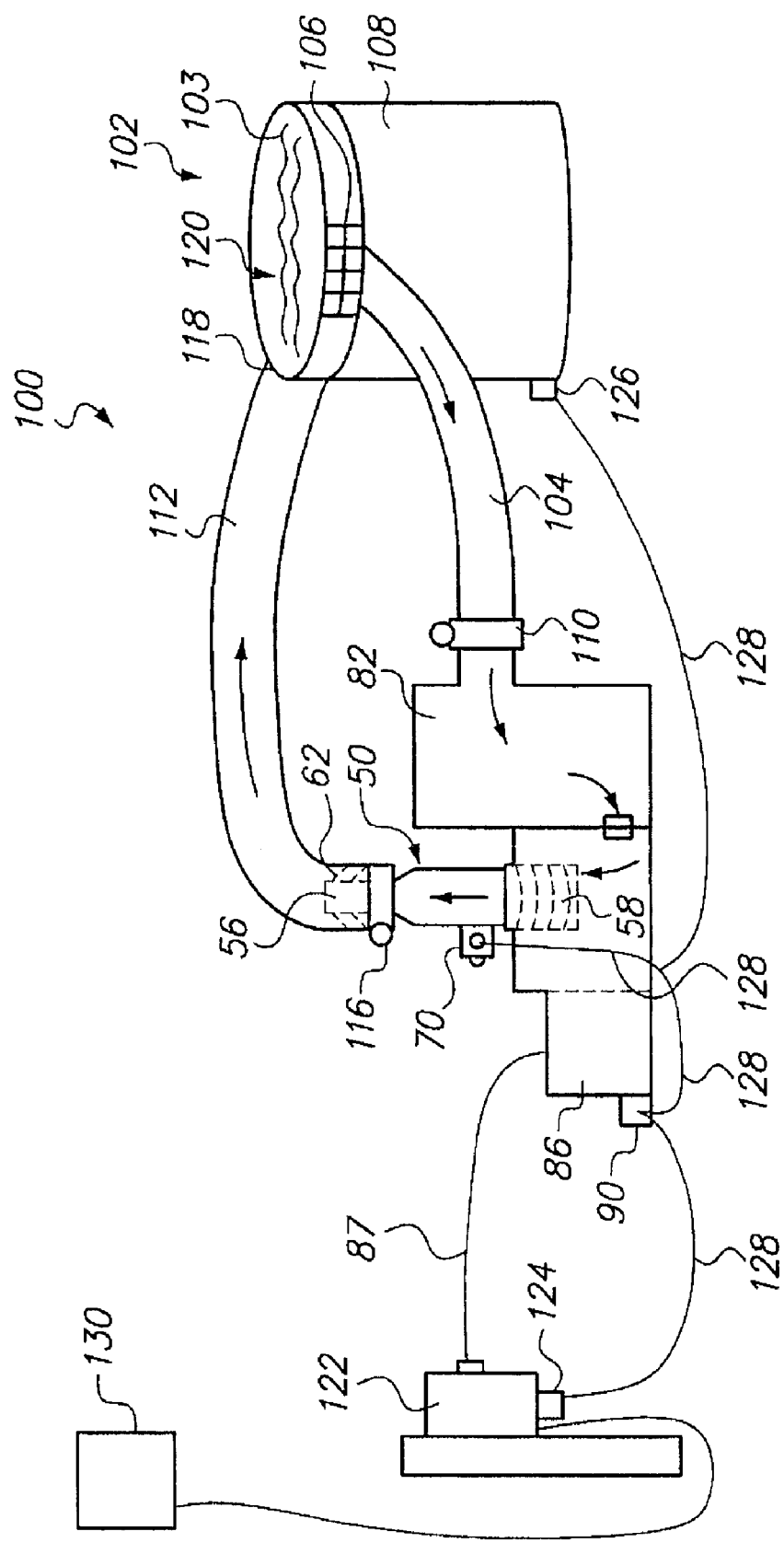
FIG. 4 is a schematic depicting an exemplary swimming pool system incorporating the assembly depicted in FIG. 3.

An exemplary pool system integrating fitting 50 is now discussed with reference to FIG. 4. Here, a pool system 100 comprises assembly 80, as described above, operably connected to a swimming pool 102. The connection between assembly 80 and swimming pool 102 may be achieved by connecting a skimmer hose 104, which extends from a skimmer 106 of shell 108 of swimming pool 102, to water reservoir 82 utilizing a clamp 110. A proximal terminal end of water return hose 112 is disposed over plurality of barbs 62 of extension member 56, and clamped thereto via a clamp 116. A distal terminal end 118 of water return hose 112 is then connected to swimming pool 102 to return filtered water 103 to an interior 120 of swimming pool 102.

Pool system 100 further comprises a power source 122 to which pump 86 is electrically connected via a plug 87. In addition to lug nut 90 located on pump 86, system 100 further comprises a lug nut 124 disposed on power source 122 and a lug nut 126 disposed on shell 108 of swimming pool 102. The electrically conductive components of pool system 100, e.g., power source 122, fitting 50, filter pump 84, shell 108, and water 103, are bonded via the physical connection of a bond wire 128 to lug nut 70 of fitting 50 and to lug nuts 90, 124, and 126. In an exemplary embodiment, bond wire 128 comprises an 8 AWG and comprises copper. System 100 further comprises a grounded panelboard 130 to which the electrically conductive components of system 100 are bonded as discussed above.

In an exemplary application, when pool system 100 is in use and an electrical current is flowing through pool system 100, bond wire 128, through its physical linkage to the electrically conductive parts of system 100, e.g., through its physical linkage to power source 122, swimming pool 102, filter pump 84, and to fitting 50, sufficiently bonds system 100. Additionally, through the integration of fitting 50 within assembly 80, wherein pool water 103 is circulated (shown by the arrows in FIG. 4) through fitting 50, and through the physical connection between fitting 50 and bond wire 128, the pool water is sufficiently bonded. Through the use of fitting 50 as described with reference to FIG. 4, it has been found that the conductive surface exposes not less than up to about 18 square inches of surface area to the pool water.

Although the principles of the present invention have been illustrated and explained in the context of certain specific embodiments, it will be appreciated by those having skill in the art that various modifications beyond those illustrated can be made to the disclosed embodiment without departing from the principles of the present invention. It is further again noted that although an exemplary application of the inventive fitting is in the bonding of swimming pool water, it is contemplated herein that the fluid bonding fitting disclosed herein may be integrated into a wide variety of assemblies and systems in which it is desired to bond a fluid in the general manner described above, wherein such systems are not limited to swimming pools, but which may also include, but not be limited to, for example whirlpools, hot tubs, saunas, and the like.

What is claimed is:

1. An assembly for bonding a fluid, wherein the assembly comprises:
    a fitting comprising:
        an electrically conductive body comprising: a base, a first extension member which extends from a first end of the base, and a second extension member which extends from a second end of the base, wherein the first end is oppositely situated from the second end; and
        an electrically conductive protrusion disposed on and extending from an exterior surface of the base;
    a fluid filter having a receiver which is in operable communication with the first extension member of the fitting;
    a return hose which is in operable communication with the second extension member of the fitting; and
    a bond wire disposed through the electrically conductive protrusion;
    wherein, as the fluid cyclically flows between the fluid filter, the fitting, and the return hose, the fluid is bonded.

2. The assembly of claim 1, wherein the second end of the base tapers inwardly towards and connects to the second extension member.

3. The assembly of claim 1, wherein the first extension member comprises a threaded exterior which is received and held by the receiver of the fluid filter, and wherein the second extension member comprises a plurality of barbs disposed on an exterior surface thereof which are received and held by the return hose.

4. The assembly of claim 3, wherein the fluid is water, and wherein the fluid source comprises at least one of a swimming pool, a whirlpool, a sauna, and a hot tub.

5. The assembly of claim 3, wherein the electrically conductive protrusion comprises a lug having a hole formed therethrough, wherein the bond wire is disposed through the hole.

6. A system for bonding a fluid, wherein the system comprises:
    a fluid source;
    a fluid bonding assembly comprising:
        a fitting comprising:
            an electrically conductive body comprising: a base, a first extension member which extends from a first end of the base, and a second extension member which extends from a second end of the base, wherein the first end is oppositely situated from the second end; and
            an electrically conductive protrusion disposed on and extending from an exterior surface of the base;
        a fluid filter having a receiver which receives and secures thereto the first extension member; and
        a pump which draws the fluid from the fluid source into the fluid filter, and wherein the fluid further flows from the fluid filter and through the fitting;
    a power source;
    a first feed which operably connects the fluid source to the filter;
    a second feed which receives and secures thereto the second extension member, wherein the second feed returns the fluid from the fitting to the fluid source; and
    a bond wire which is disposed through the electrically conductive protrusion, and which is in electrical communication with the power source, the pump, the fitting, and the fluid source.

7. The system of claim 6, wherein the electrically conductive protrusion comprises a lug having a hole formed therethrough, wherein the bond wire is disposed through the hole.

8. The system of claim 7, wherein the second end of the base tapers inwardly towards the second extension member.

9. The system of claim 8, wherein the first extension member comprises a threaded exterior, and wherein the second extension member comprises a plurality of barbs disposed on an exterior surface thereof.

10. The system of claim 7, wherein the fluid comprises water, and wherein the fluid source comprises a swimming pool.

11. The system of claim 10, wherein the second feed comprises a return hose attached to the swimming pool, and wherein the first feed comprises a skimmer hose attached to a skimmer of the swimming pool, wherein the skimmer hose feeds the water from the swimming pool into the fluid bonding assembly.

12. A fitting for bonding a fluid, comprising:
    an electrically conductive body comprising:
        a base having a first end oppositely situated to a second end;
        a first extension member which extends from the first end of the base, wherein the first extension member is configured to be received by a fluid filter, wherein the fluid filter receives the fluid from a water reservoir in communication with a swimming pool; and
        a second extension member which extends from the second end of the base, wherein the second extension member is configured to be received by and secured to a return hose which is in communication with the swimming pool; and
    an electrically conductive protrusion disposed on and extending from an exterior surface of the base, wherein the electrically conductive protrusion is configured to hold a bond wire.

13. The fitting of claim 12, wherein the electrically conductive protrusion comprises a lug having a hole formed therethrough, wherein the bond wire is disposed through the hole.

14. The fitting of claim 13, wherein the second end of the base tapers inwardly towards the second extension member.

15. The fitting of claim 14, wherein the first end of the body comprises a threaded exterior which is received by the fluid filter, and further wherein the second end comprises a plurality of barbs disposed on an exterior surface thereof which receive and secure the water return hose to the fitting.

16. The fitting of claim 15, wherein the base, the first extension member, and the second extension member comprise a substantially cylindrical configuration.

* * * * *